United States Patent
Mochizuki

(10) Patent No.: US 8,496,414 B2
(45) Date of Patent: Jul. 30, 2013

(54) CLAMPING MEMBER, TOOL HOLDER AND INDEXABLE CUTTING TOOL

(75) Inventor: Katsura Mochizuki, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 311 days.

(21) Appl. No.: 13/011,502

(22) Filed: Jan. 21, 2011

(65) Prior Publication Data

US 2011/0116879 A1    May 19, 2011

Related U.S. Application Data

(63) Continuation-in-part of application No. PCT/JP2009/063130, filed on Jul. 22, 2009.

(30) Foreign Application Priority Data

Jul. 22, 2008 (JP) .................................. 2008-188256

(51) Int. Cl.
*B23B 27/16* (2006.01)

(52) U.S. Cl.
CPC ...................................... *B23B 27/16* (2013.01)
USPC .......................................... 407/104; 407/107

(58) Field of Classification Search
USPC ................. 407/103, 104, 105, 107, 109, 111, 407/112
IPC ........................................................ B23B 27/16
See application file for complete search history.

(56) References Cited

U.S. PATENT DOCUMENTS

| | | | |
|---|---|---|---|
| 4,600,341 A | 7/1986 | Board | |
| 5,536,120 A | 7/1996 | Miller | |
| 5,944,457 A * | 8/1999 | Tjernstrom | 407/105 |
| 6,457,914 B1 * | 10/2002 | Andras et al. | 407/105 |
| 7,195,427 B2 * | 3/2007 | Sjoo et al. | 407/82 |
| 2011/0164933 A1 * | 7/2011 | Park et al. | 407/107 |

FOREIGN PATENT DOCUMENTS

| | | |
|---|---|---|
| JP | 1998-071508 | 3/1998 |
| JP | 2008-132566 | 6/2008 |
| JP | 2009-039832 | 2/2009 |
| SU | 1433646 | 10/1988 |

(Continued)

OTHER PUBLICATIONS

International Search Report in PCT/JP2009/063130, dated Sep. 15, 2009.

(Continued)

*Primary Examiner* — Daniel Howell
*Assistant Examiner* — Alan Snyder
(74) *Attorney, Agent, or Firm* — Womble Carlyle

(57) ABSTRACT

A clamping member for reliably inserting a protrusion portion thereof into a mounting hole of a cutting insert so as to engage the protrusion portion with an inner peripheral surface of the cutting insert and strongly clamp the cutting insert on a tool holder. The clamping member includes a body having a top surface engageable with a head of a clamping bolt, a bottom surface facing the tool holder and a bolt hole for insertion of the clamping bolt, and a protrusion portion protruding from the bottom surface and being engageable with a mounting hole formed in the cutting insert. The protrusion portion has an inclined surface facing toward a rotational direction about a center axis of the clamping bolt, the inclined surface is inclined so that the protrusion portion is gradually tapered from a base side thereof proximate the bottom surface toward an end side thereof distal from the bottom surface.

12 Claims, 6 Drawing Sheets

FOREIGN PATENT DOCUMENTS

| SU | 1454580 | 1/1989 |
|---|---|---|
| SU | 1521530 | 11/1989 |
| WO | WO 2007/145649 | 12/2007 |

OTHER PUBLICATIONS

Search report dated Dec. 20, 2011 issued in counterpart European Application No. 09800419.5.

Decision on Grant dated Nov. 9, 2011 issued in counterpart Russian Application No. 2011106495.

International Preliminary Report on Patentability in PCT/JP2009/063130, dated Feb. 3, 2011.

Office Action in counterpart Japanese application No. 2010-521723, dated Apr. 15, 2011.

Office Action in counterpart Japanese application No. 2010-521723, dated Dec. 24, 2010.

* cited by examiner

CLAMPING MEMBER, TOOL HOLDER AND INDEXABLE CUTTING TOOL

RELATED APPLICATIONS

This is a Continuation-in-part of International Application No. PCT/JP2009/063130, filed 22 Jul. 2009 and published as WO 2010/010905 on 28 Jan. 2010, which claims priority to Japanese Patent Application No. 2008-188256, filed Jul. 22, 2008. The contents of the aforementioned International and priority applications are incorporated by reference in their entirety

BACKGROUND OF THE INVENTION

1. Field of the Invention

The present invention relates to a clamping member for clamping a cutting insert on a tool holder, a tool holder provided with the clamping member, and an indexable cutting tool which has a cutting insert mounted on the tool holder.

2. Description of the Related Art

A throw away cutting tool that has a cutting insert removably fixed on the top end surface of the distal end portion of a tool holder has been known. Japanese Patent Laid-Open No. H10-071508(1998) discloses a mechanism for mounting a cutting insert on a tool holder by pressing the cutting insert placed on an insert mounting seat, which is formed on the top end surface of the distal end portion of the tool holder, against the bottom surface and the wall surface of the insert mounting seat with a clamping piece (a clamping member) from the above of the cutting insert. In the mounting mechanism, the clamping member has a sliding surface mutually contacting with an inclined surface of the cutting holder and a pressing portion formed with a protrusion engaging with a mounting hole, which is formed in the cutting insert. When pressing the clamping member with a clamping bolt, the protrusion is inserted into the mounting hole of the insert, as the clamping member is moved down, and the sliding surface of the clamping member is mutually engaged with the inclined surface of the tool holder, so that the clamping member moves in a direction along with the inclined surface with respect to the tool holder. As a result, the clamping member presses the cutting insert both toward the bottom surface and the wall surface.

In the above type of cutting insert, as the clamping bolt is tightened, a moment which rotates the clamping member about a center axis of the clamping bolt acts thereon associated with the rotation of the clamping member. Because of this, the tightening of the clamping bolt possibly causes the protrusion of the rotated clamping member to be misaligned with the mounting hole of the cutting insert. Consequently, the protrusion might not be inserted into the mounting hole so that the cutting insert might not be securely clamped on the insert mounting seat.

It is an object of the present invention is to provide a clamping member being preferable to clamp a cutting insert on a tool holder, a tool holder provided with the clamping member and an indexable cutting tool in which a cutting insert is mounted on the tool holder, for solving the above problem.

SUMMARY OF THE INVENTION

The present invention provides a clamping member for a cutting insert that clamps the cutting insert on a tool holder and includes a body having a top surface being engageable with a head of a clamping bolt, a bottom surface facing the tool holder and a bolt hole for insertion of the clamping bolt, the bolt hole passing through between the top surface and the bottom surface, and a protrusion portion protruding from the bottom surface and being engageable with a mounting hole formed in the cutting insert, wherein the protrusion portion has an inclined surface facing toward a rotational direction about a center axis of the clamping bolt, wherein the inclined surface is inclined so that the protrusion portion is gradually tapered from a base side thereof proximate the bottom surface toward an end side thereof distal from the bottom surface.

Preferably, the protrusion portion has first and second inclined surfaces facing toward first and second rotational directions about a center axis of the clamping bolt, respectively. The first and second surfaces are inclined so that the protrusion portion is gradually tapered from a base side toward an end side thereof.

More preferably, the inclined surface is smoothly curved in a circumferential direction of the protrusion portion.

Further, the inclined surface is configured such that a predetermined region in an outer peripheral surface of the protrusion, at a location other than at the inclined surface, engages an inner peripheral surface of the mounting hole.

Still further, the protrusion portion has a basic shape such as a circular cylindrical shape or an elliptic cylindrical shape with a major axis in a longitudinal direction of the clamping member. At least one of the side surface portions of the basic shape facing toward first and second rotational directions about the center axis of the clamping bolt is truncated so that the protrusion portion, which is gradually tapered from its base side proximate the bottom surface toward its end side distal from the bottom surface, can be employed.

In the clamping member according to the present invention, the protrusion portion is provided with inclined surfaces inclining so that the protrusion portion is gradually tapered from a base side toward an end side thereof, thereby the protrusion portion can be smoothly inserted into the mounting hole of the cutting insert by the operation of the inclined surface when rotated about the center axis of the clamping bolt.

The tool holder according to the present invention is characterized in having the clamping member described above.

The cutting tool according to the present invention is characterized in having the tool holder described above and a cutting insert removably mounted on the tool holder.

According to the present invention, the protrusion of the clamping member is reliably inserted into the mounting hole of the cutting insert so as to engage the protrusion with the inner peripheral surface of the cutting insert, so the cutting insert can be clamped on the tool holder.

Further features of the present invention will become apparent from the following description of exemplary embodiments with reference to the attached drawings.

DESCRIPTION OF THE EMBODIMENTS

Figure 1A:
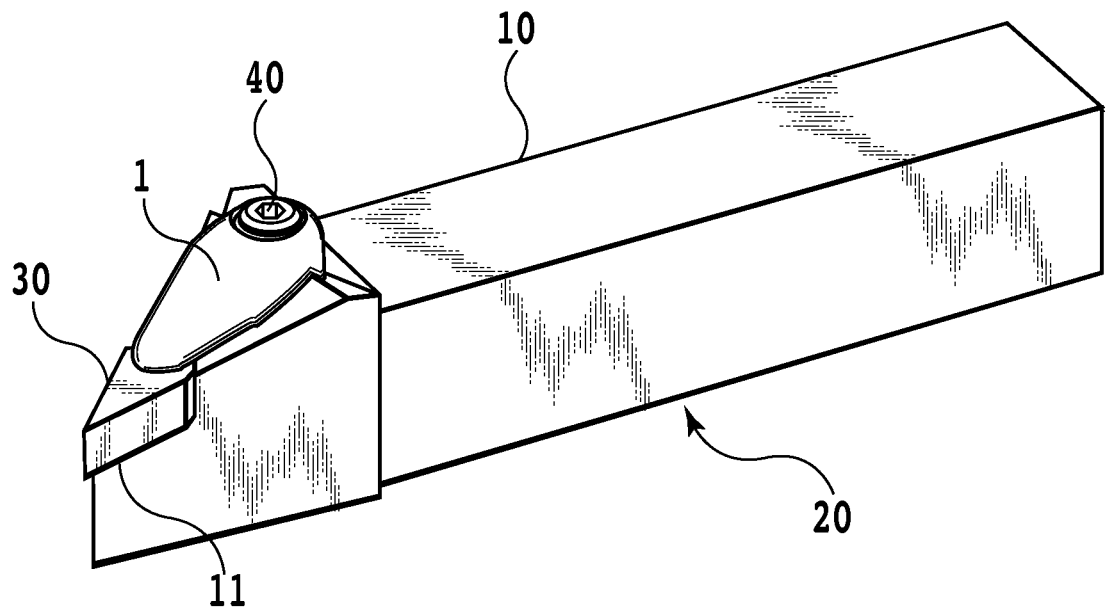
FIG. 1A is a perspective view showing a cutting tool according to one embodiment of the present invention.
Figure 1B:
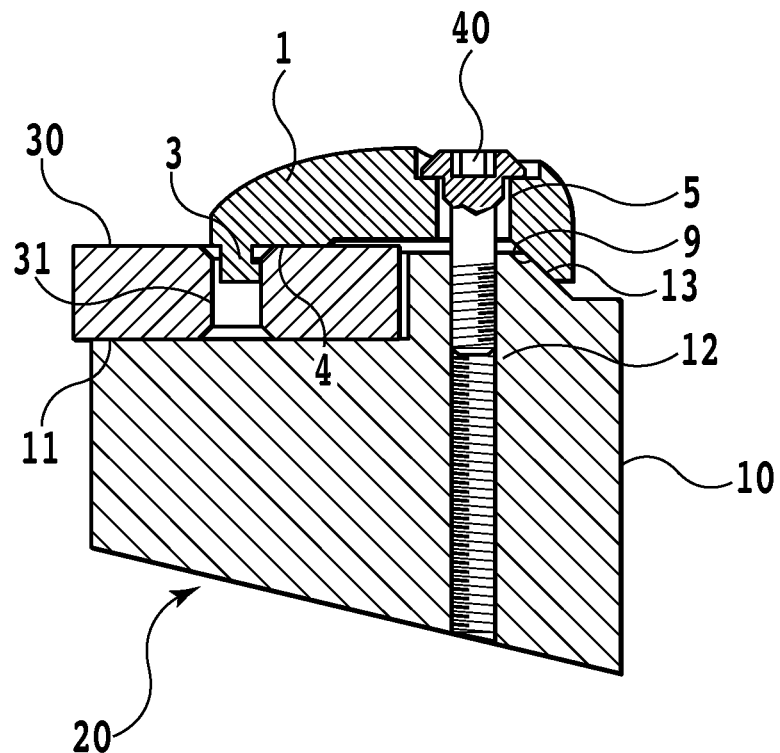
FIG. 1B is a cross-sectional view of a clamping member cut along a plane in a longitudinal direction of the clamping member.
Figure 1C:
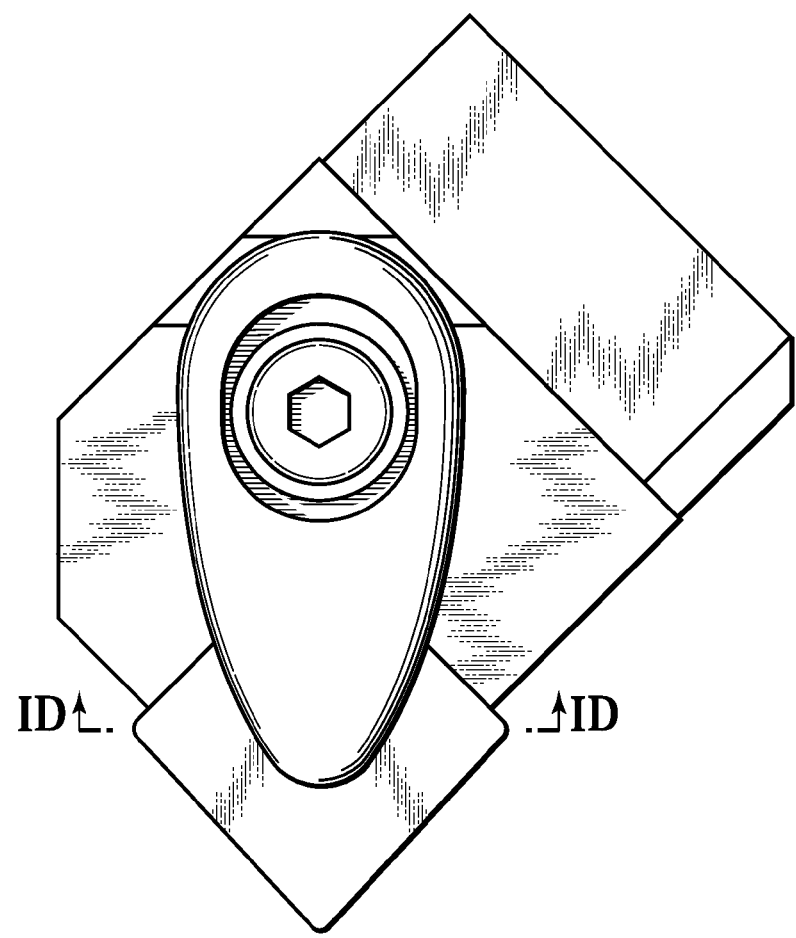
FIG. 1C is a plan view showing a distal end portion of the cutting tool.
Figure 1D:
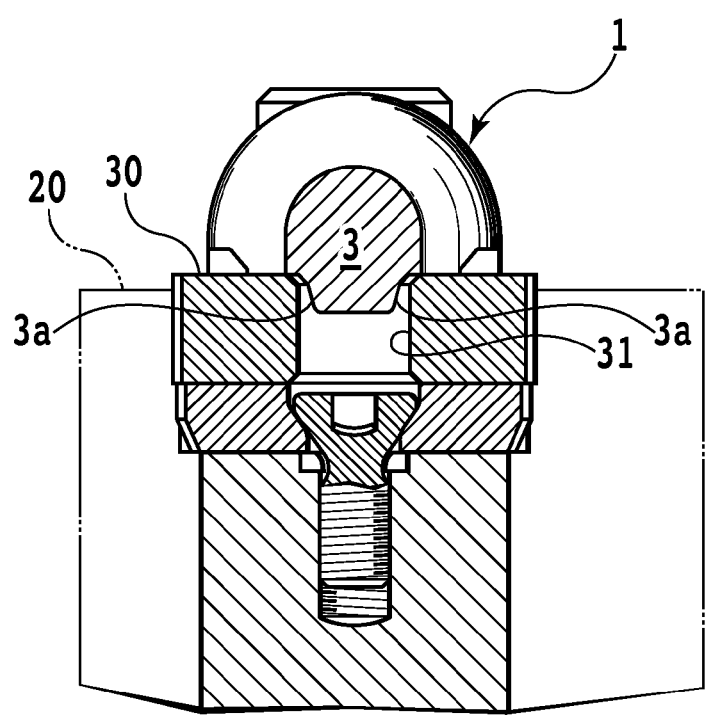
FIG. 1D is a cross-sectional view along the line ID-ID in FIG. 1C.

An embodiment of the present invention will be described below in detail with reference to the attached drawings. FIGS. 1A to 1D are views showing a cutting tool of one embodiment according to the present invention. FIG. 1A is an outer perspective view of the cutting tool. FIG. 1B is a cross-sectional view of the distal end portion of the cutting tool cut along a plane in the longitudinal direction of the clamping member. FIG. 1C is a plan view of the distal end portion of the cutting tool. FIG. 1D is a cross-sectional view of the distal end portion of the cutting tool along the line ID-ID in FIG. 1C.

A cutting tool 20 which is used for turning includes a clamping member 1, a tool holder 10, and a cutting insert 30 removably mounted on an insert seat 11 of the cutting holder 10, as shown in FIG. 1A to 1D.

The tool holder 10 is made of steel material or the like and has a body with a substantially rectangular cuboidal shank, an insert mounting seat formed on the distal end portion of the body, an internal threaded hole 12 bored near the insert mounting seat 11, a rearwardly inclined surface 13 formed near the internal threaded hole 12 and a clamping member 1 clamped on the tool holder 10 with a clamping bolt 40.

In the cutting tool 20, the cutting insert 30 is placed on the insert mounting seat 11 of the tool holder 10, and the clamping member 1 is arranged on the top surface of the cutting insert 30. When the clamping bolt 40 is screwed through a bolt hole 5 of the clamping member 1 into the internal threaded hole 12 of the tool holder 10, the head of the clamping bolt 40 engages the top surface of the clamping member 1 so that the cutting insert 30 is pressed toward the insert mounting seat 11 by the pressing surface 4 of the clamping member 1 and fixed thereon.

The cutting insert 30 is made of a material such as cemented carbide, cermet or ceramic. The cutting insert 30 has a substantially rhombic plate shape, as shown in FIG. 1A to 1C, and is provided with rake faces formed on the top surface thereof, flank faces on the side surface intersecting with the rake face and cutting edges formed on intersection portions where the respective rake faces and the respective flank faces are intersected with each other. A mounting hole 31 is formed in the center portion of the cutting insert 30.

Figure 2A:
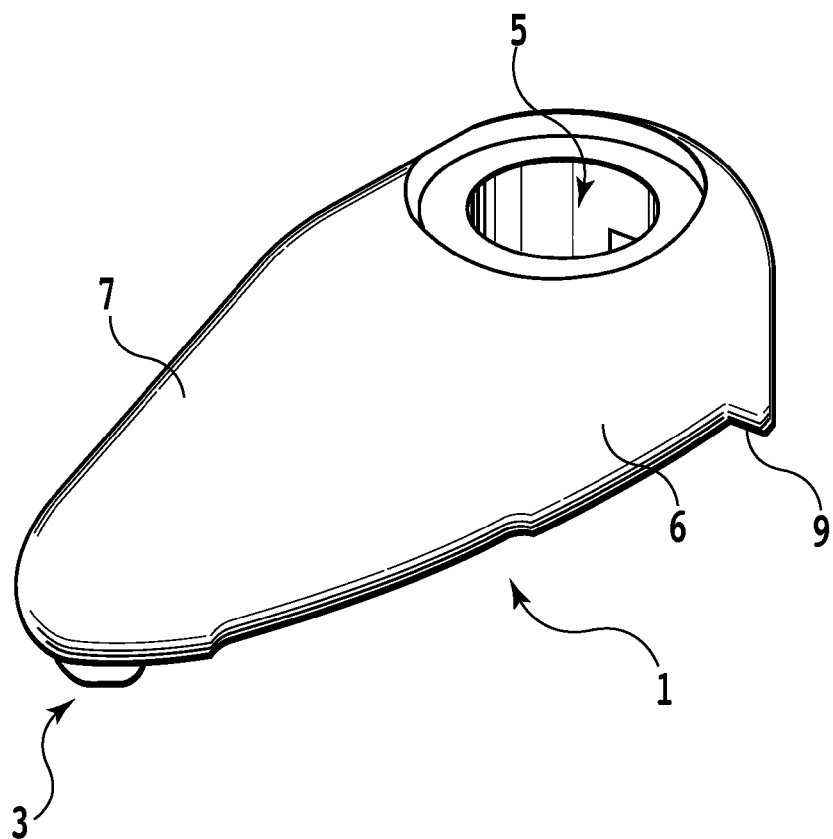
FIG. 2A is an exterior perspective view of the clamping member of the one embodiment according to the present invention.
Figure 2B:
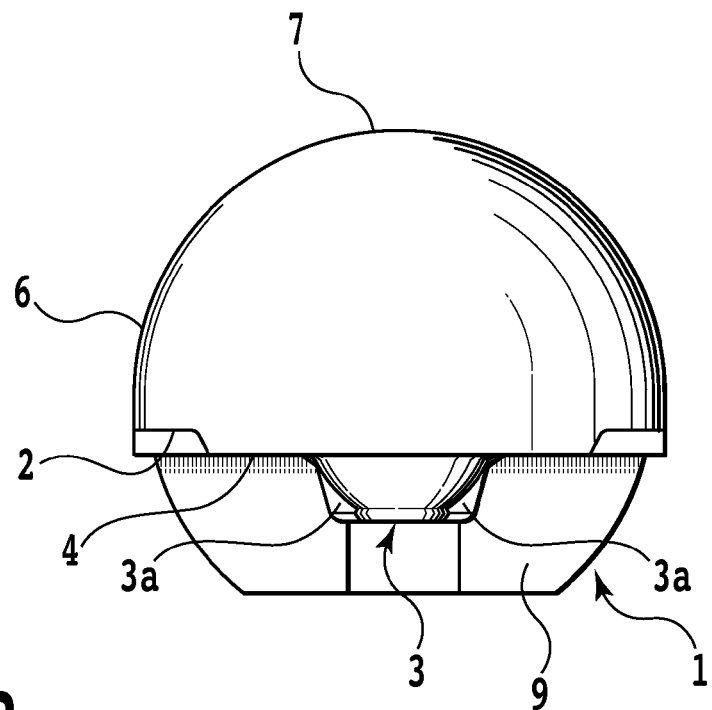
FIG. 2B is a front view of the clamping member in FIG. 2A from the front side thereof.
Figure 2C:
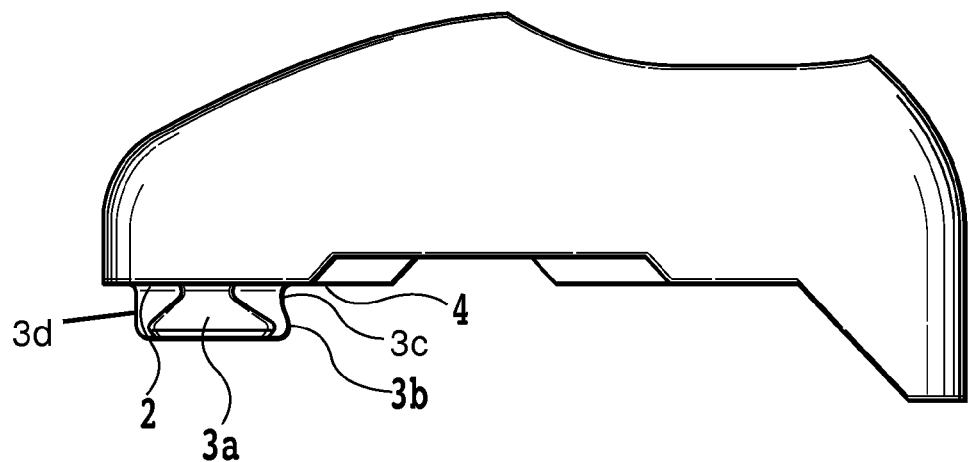
FIG. 2C is a side view of the clamping member in FIG. 2A.
Figure 2D:
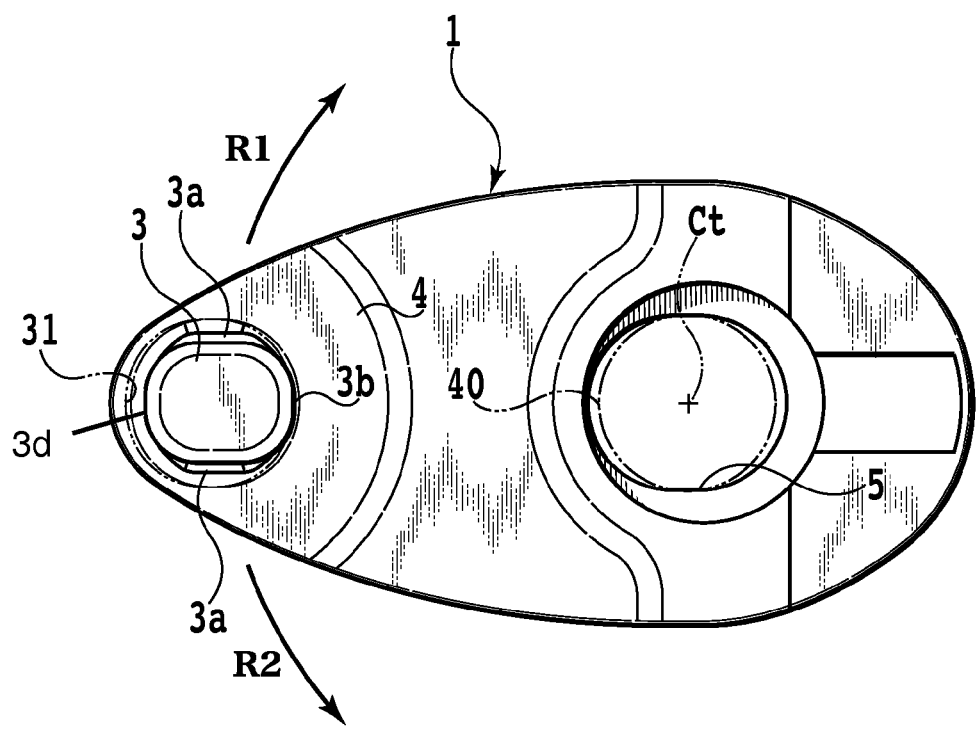
FIG. 2D is a bottom view of the clamping member in FIG. 2A.
Figure 2E:
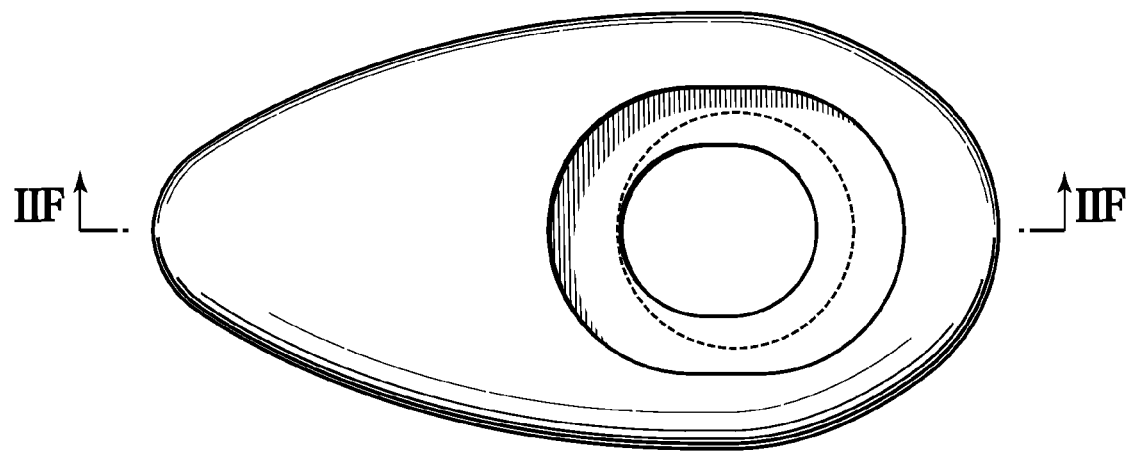
FIG. 2E is a top view of the clamping member in FIG. 2A.
Figure 2F:
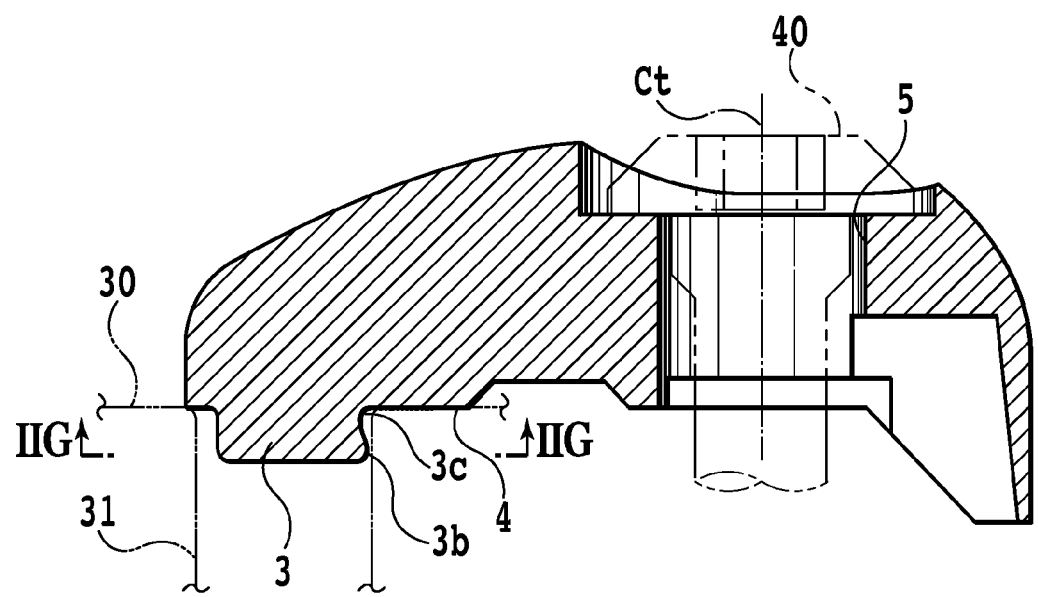
FIG. 2F is a cross-sectional view along the line IIF-IIF in FIG. 2E.
Figure 2G:
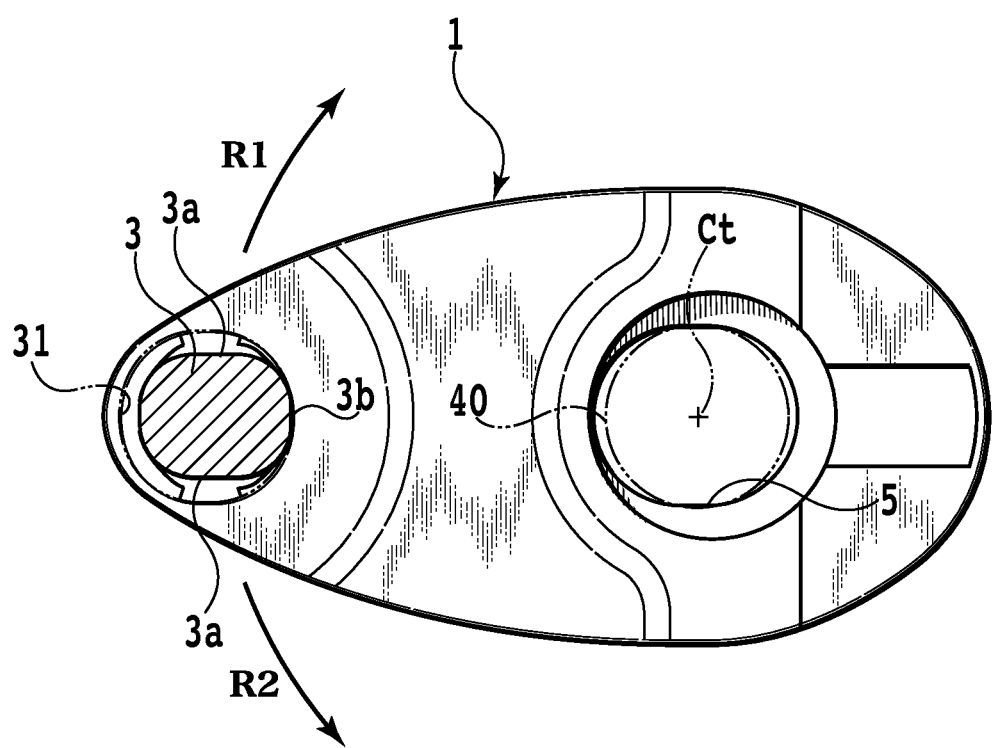
FIG. 2G is a cross-sectional view along the line IIG-IIG line of the clamping member in FIG. 2F.

FIGS. 2A to 2G are views showing a structure of the clamping member. FIG. 2A is an outer perspective view of the clamping member. FIG. 2B is a front view of the clamping member. FIG. 2C is a side view of the clamping member. FIG. 2D is a bottom view of the clamping member. FIG. 2F is a cross-sectional view of the clamping member along the line IIF-IIF in FIG. 2E. FIG. 2G is a cross-sectional view of the clamping member along the line IIG-IIG.

The clamping member 1 according to the present invention is made of a material such as a cemented carbide, a high-speed steel, an alloy steel, and a stainless steel. The body of the clamping member 1 has an elongated substantially semi-oval shape whose front end side in the longitudinal direction is smaller than the rear end side in width and height. The body of the clamping member 1 is provided on the bottom surface 2 of the front end side thereof in the longitudinal direction with a protrusion portion 3 engaging with the mounting hole 31 of the cutting insert 30 and a pressing surface 4 pressing the top surface of the cutting insert 30.

The body of the clamping member 1 is provided with a sliding surface 9 contacting with the inclined surface 13 formed on the tool holder 10 on the rear end side thereof. In addition, a bolt hole 5, which passes through the clamping member in a vertical direction, is provided between the protrusion portion 3 and the inclined surface 13 in the longitudinal direction of the body of the clamping member 1.

The protrusion portion 3 has two inclined surfaces 3a, 3a facing toward opposite rotational directions R1 and R2 about a center axis Ct of the clamping bolt 40. The inclined surfaces 3a, 3a are inclined so that the protrusion portion 3 is gradually tapered from a base side thereof proximate the bottom surface 2 of the clamping member toward an end side thereof distal from the bottom surface 2 of the clamping member. That is, the protrusion portion 3 has a circular cylindrical basic shape, and the side surface portions thereof facing toward the first and second rotational directions about the center axis Ct of the clamping bolt 40 are truncated so that the protrusion portion 3 is gradually tapered from its base side toward its end side. As will be understood from the drawing, each of the inclined surfaces 3a, 3a is smoothly curved in the circumferential direction of the protrusion portion 3 and linearly extends from the base side toward the end side. Also in the circumferential direction, as seen in FIG. 2D, the inclined surfaces 3a are convexly curved and smoothly connect to other outer surfaces of the protrusion portion 3, such as a non-inclined front surface 3d on the front end side of the protrusion portion 3 and surfaces 3b, 3c, described below, on the rear end side of the protrusion portion 3.

As shown in FIGS. 2C, 2D, 2F and 2G, the protrusion portion 3 has a concave curved, recessed surface 3c on the base side of the protrusion portion 3 and a convex curved contacting surface 3b on the end side of the protrusion portion 3, on the outer peripheral surface located on the rear end side of the protrusion portion in the longitudinal direction of the clamping member 1. The contacting surface 3b engages with the inner peripheral surface of the mounting hole 31. As seen in the figures, the contacting surface 3b at the protrusion end side is rearward of the recessed surface 3c at the protrusion base side, i.e., the contacting surface 3b is farther from the forwardmost portion of the clamping member 1 than the recessed surface 3c. Thus, as best seen in a cross-sectional view of the clamping member 1 passing through protrusion 2 and the bolt hole 5 (See FIG. 2F showing the protrusion portion 3 in the phantom mounting hole 31), the contacting surface 3b forms an overhang relative to the recessed surface 3c. Accordingly, while the contacting surface 3b engages with the inner peripheral surface of the mounting hole 31 of the cutting insert 30 in the clamped state, the recess surface 3c is spaced apart therefrom.

In the present embodiment, when the protrusion portion 3 is inserted into the mounting hole 31 of the cutting insert 30, the inclined surface 3a, which has a smooth curved surface formed on the protrusion portion 3, can cause the protrusion portion 3 to be smoothly inserted into the mounting hole 31, even if the clamping member 1 is slightly rotated about the center axis of the clamping bolt 40 and the inclined surface 3a interferes with an opening peripheral edge portion of the mounting hole 31.

As the bolt is tightened in the state that the protrusion portion 3 is inserted into the mounting hole 31, torque about the center axis Ct of the clamping bolt 40 acts on the clamping member 1 so that the contacting surface 3b of the protrusion 3 makes a firm line or point contact with the inner peripheral surface of the mounting hole 31. And, the cutting insert 30 is smoothly urged to move from the distal end side toward the shank side of the tool holder 10 by interaction of the inclined surface 13 of the tool holder 10 and the sliding surface 9 of the clamping member 1 contacted therewith. That is, the clamping member 1 moves the cutting insert from the distal end side toward the shank side of the tool holder 10 while pressing down on the top surface of the cutting insert 30, so that the cutting insert 30 is stably and firmly clamped on the tool holder 10. As a result, a chatter vibration of the cutting insert 30 associated with a turning, a damage of the cutting edge and the like can be suppressed so that a fine machined surface can be obtained.

In the present embodiment, the base side of the protrusion 3 of the clamping member 1 is larger than the end side thereof in width. Accordingly, reduction of the strength of the base side where stress tends to concentrate when the protrusion 3 engages with the mounting hole 31 of the cutting insert can be avoided, so that a breakage of the protrusion portion 3 can be reduced.

In the present embodiment, the two inclined surfaces 3a, 3a are formed on the protrusion portion 3 correspondingly to the two rotational directions R1 and R2, however, a single inclined surface 3a also can be employed. That is, the inclined surface 3a can be formed only on the side leading the rotation of the clamping member 1 when tightening the clamping bolt 40 is tightened (the rotational direction when the clamping bolt is tightened). Further, as the basic shape of the protrusion portion 3, the substantially circular cylindrical shape as well as a substantially elliptic or oval cylindrical shape with a major axis in the longitudinal direction of the clamping member (in the same direction as the moving direction of the cutting insert) also can be employed.

As means for preventing the clamping member from rotating, engaging means having a convex or concave portion formed on the body and a concave or convex portion being engageable therewith can be employed, not shown in the figure, instead of means by the contact of the sliding surface 9 of the clamping member and the inclined surface 13 of the tool holder according to the present embodiment. In such an engaging means, it is practically impossible to precisely engage the engaging means not so as to rotate the clamping member at all. According to the clamping member 1 of the present embodiment, even in case of using such an engaging means, the cutting insert 30 can be strongly clamped because the protrusion portion 3 of the body is reliably inserted into the mounting hole 31 of the cutting insert 30 and firmly engages the inner peripheral surface of the mounting hole 31.

In the present embodiment, the clamping member is formed in the elongated semi-oval shape. However, the shape of the clamping member 6 is not limited to this, and optional shapes such as rectangular, circular and asymmetric shapes can be employed.

In the present embodiment, the cutting tool 20 used for a turning has been described as an indexable cutting tool, however, the present invention is not limited to this. The present invention is also applicable to a variety of indexable cutting tools such as a face cutter.

In the present embodiment, the cutting insert 30 having a substantially rhombic plate shape is used, however, the shape of the cutting insert 30 is not limited to this. Cutting inserts having shapes such as a circular, triangle and rectangular shape can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A clamping member for clamping a cutting insert on a tool holder, comprising:
    a body having a top surface engageable with a head of a clamping bolt, a bottom surface for facing the tool holder and a bolt hole for insertion of the clamping bolt, the bolt hole passing through between the top surface and the bottom surface; and
    a protrusion portion protruding from the bottom surface and engageable with a mounting hole formed in the cutting insert, wherein the protrusion portion has an inclined surface facing toward a rotational direction about a center axis of the clamping bolt; wherein:
    the inclined surface is inclined so that the protrusion portion is gradually tapered from a base side thereof proximate the bottom surface toward an end side thereof distal from the bottom surface;
    the inclined surface is smoothly and convexly curved in a circumferential direction of the protrusion portion, and is smoothly connected to an outer surface other than the inclined surface; and
    a cross section in a base portion of the protrusion portion has a substantially circular shape and a cross section in an end portion of the protrusion has a substantially elliptic shape having a major axis exending in a longitudinal direction of the clamping member.

2. The clamping member according to claim 1, wherein:
    the protrusion portion has first and second inclined surfaces facing toward first and second rotational directions about a center axis of the clamping bolt, respectively; and
    the first and second surfaces are inclined so that the protrusion portion is gradually tapered on opposite sides from its base side to its end side.

3. The clamping member according to claim 1, wherein:
    a predetermined region in an outer peripheral surface of the protrusion is configured to engage an inner peripheral surface of the mounting hole; and
    the predetermined region is at a location other than at the inclined surface.

4. The clamping member according to claim 1, wherein:
    at least one of the side surface portions of the basic shape facing toward first and second rotational directions about the center axis of the clamping bolt is truncated so that the protrusion portion is gradually tapered from its base side toward its end side.

5. The clamping member according to claim 1, wherein:
    a rear end side of the protrusion portion has a concave curved recessed surface at the protrusion base side and a contacting surface at the protrusion end side;
    the contacting surface is rearward of the concave curved recessed surface in a cross-sectional view of the clamping member which passes through the protrusion and the bolt hole; and
    the contacting surface forms an overhang relative to the concave curved recessed surface.

6. A tool holder comprising:
    a tool holder body; and
    a clamping member for clamping a cutting insert on the tool holder body with a clamping bolt, the clamping member comprising:
        a body having a top surface engageable with a head of the clamping bolt, a bottom surface for facing the tool holder body and a bolt hole for insertion of the clamping bolt, the bolt hole passing through between the top surface and the bottom surface; and a protrusion portion protruding from the bottom surface and engageable with a mounting hole formed in the cutting insert, wherein the protrusion portion has an inclined surface facing toward a rotational direction about a center axis of the clamping bolt, wherein:

the inclined surface is inclined so that the protrusion portion is gradually tapered from a base side thereof proximate the bottom surface toward an end side thereof distal from the bottom surface;

the inclined surface is smoothly and convexly curved in a circumferential direction of the protrusion portion, and is smoothly connected to an outer surface other than the inclined surface; and a cross section in a base portion of the protrusion portion has a substantially circular shape and a cross section in an end portion of the protrusion has a substantially elliptic shape having a major axis exending in a longitudinal direction of the clamping member.

7. The tool holder according to claim 6, wherein, in the clamping member:

a rear end side of the protrusion portion has a concave curved recessed surface at the protrusion base side and a contacting surface at the protrusion end side;

the contacting surface is rearward of the concave curved recessed surface in a cross-sectional view of the clamping member which passes through the protrusion and the bolt hole; and the contacting surface forms an overhang relative to the concave curved recessed surface.

8. A cutting tool, comprising:

a tool holder body;

a cutting insert removably mounted on the tool holder body; and a clamping member that clamps the cutting insert on the tool holder body with a clamping bolt, the clamping member comprising:

a body having a top surface engaged to a head of the clamping bolt, a bottom surface facing the tool holder body and a bolt hole occupied by the clamping bolt, the bolt hole passing through between the top surface and the bottom surface; and a protrusion portion protruding from the bottom surface and engaged with a mounting hole formed in the cutting insert, wherein the protrusion portion has an inclined surface facing toward a rotational direction about a center axis of the clamping bolt, wherein:

the inclined surface is inclined so that the protrusion portion is gradually tapered from a base side thereof proximate the bottom surface toward an end side thereof distal from the bottom surface;

the inclined surface is smoothly and convexly curved in a circumferential direction of the protrusion portion, and is smoothly connected to an outer surface other than the inclined surface; and a cross section in a base portion of the protrusion portion has a substantially circular shape and a cross section in an end portion of the protrusion has a substantially elliptic shape having a major axis exending in a longitudinal direction of the clamping member.

9. The cutting tool according to claim 8, wherein:

in the clamping member:

a rear end side of the protrusion portion has a concave curved recessed surface at the protrusion base side and a contacting surface at the protrusion end side;

the contacting surface is rearward of the curved concave recessed surface in a cross-sectional view of the clamping member which passes through the protrusion and the bolt hole; and the contacting surface forms an overhang relative to the concave curved recessed surface;

the contacting surface is engaged to an inner peripheral surface of the cutting insert's mounting hole; and the curved recess surface is spaced apart from the inner peripheral surface of the cutting insert's mounting hole.

10. The clamping member according to claim 1, wherein:

the inclined surface connects to a non-inclined front surface on the front end side of the protrusion portion.

11. The tool holder according to claim 6, wherein:

the inclined surface connects to a non-inclined front surface on the front end side of the protrusion portion.

12. The cutting tool according to claim 8, wherein:

the inclined surface connects to a non-inclined front surface on the front end side of the protrusion portion.

* * * * *